(12) United States Patent
Lin et al.

(10) Patent No.: US 8,700,847 B2
(45) Date of Patent: Apr. 15, 2014

(54) METHOD AND SYSTEM FOR MANAGING READ/WRITE OPERATIONS ON AN ELECTRONIC DEVICE THAT INCLUDES A PLURALITY OF HARD DISKS, AND AN ELECTRONIC DEVICE INCORPORATING THE SAME

(75) Inventors: Yi-Jiun Lin, New Taipei (TW); Chuan-Yi Liang, New Taipei (TW)

(73) Assignee: Wistron Corporation, New Taipei (TW)

( * ) Notice: Subject to any disclaimer, the term of this patent is extended or adjusted under 35 U.S.C. 154(b) by 182 days.

(21) Appl. No.: 13/354,417

(22) Filed: Jan. 20, 2012

(65) Prior Publication Data
US 2012/0215977 A1    Aug. 23, 2012

(30) Foreign Application Priority Data

Feb. 17, 2011 (TW) .............................. 100105241 A (51) Int. Cl.
*G06F 12/00* (2006.01)
(52) U.S. Cl.
USPC ............................................. 711/114; 714/39
(58) Field of Classification Search
USPC ............................................. 711/114; 714/39
See application file for complete search history.

(56) References Cited

U.S. PATENT DOCUMENTS

| | | | |
|---|---|---|---|
| 2,958,324 A | 11/1960 | Berkemann | |
| 4,644,940 A | 2/1987 | Nakamura | |
| 5,529,075 A | 6/1996 | Clark | |
| 5,843,085 A | 12/1998 | Graser | |
| 6,093,163 A | 7/2000 | Chong et al. | |
| 6,318,373 B1 | 11/2001 | Kasahara | |
| 6,391,031 B1 | 5/2002 | Toomey | |
| 6,964,645 B1 | 11/2005 | Smits | |
| 8,140,750 B2 * | 3/2012 | Barsness et al. | 711/114 |
| 2008/0178495 A1 | 7/2008 | Stein et al. | |
| 2010/0024555 A1 * | 2/2010 | Gross et al. | 73/579 |
| 2010/0318736 A1 * | 12/2010 | Balsubramanian | 711/114 |
| 2010/0332646 A1 * | 12/2010 | Balasubramanian et al. | 709/224 |
| 2012/0151169 A1 * | 6/2012 | Mori et al. | 711/166 |

FOREIGN PATENT DOCUMENTS

| | | |
|---|---|---|
| TW | I321274 | 3/2010 |
| TW | I323883 | 4/2010 |
| TW | I332200 | 10/2010 |

* cited by examiner

*Primary Examiner* — Hashem Farrokh
(74) *Attorney, Agent, or Firm* — The Mueller Law Office, P.C.

(57) ABSTRACT

A method for managing read/write (R/W) operations on an electronic device with hard disks, includes: upon receipt of R/W operation information related to an intended R/W operation, configuring a processor to decide which of the hard disks will be read/written with reference to the R/W operation information and sets of pre-established performance information. The sets respectively correspond to R/W operation settings. Each set includes multiple pieces of information each containing a performance indication related to a corresponding one of candidate combinations of the hard disks under the corresponding R/W operation setting. The decision is made with reference to the set, the R/W operation setting corresponding to which matches the R/W operation information.

15 Claims, 5 Drawing Sheets

METHOD AND SYSTEM FOR MANAGING READ/WRITE OPERATIONS ON AN ELECTRONIC DEVICE THAT INCLUDES A PLURALITY OF HARD DISKS, AND AN ELECTRONIC DEVICE INCORPORATING THE SAME

CROSS-REFERENCE TO RELATED APPLICATION

This application claims priority of Taiwanese application no. 100105241, filed on Feb. 17, 2011, the disclosure of which is incorporated herein by reference.

BACKGROUND OF THE INVENTION

1. Field of the Invention

The invention relates to a technology for managing hard disks, more particularly to a method and a system for managing read/write operations on an electronic device that includes a plurality of hard disks.

2. Description of the Related Art

At present, hard disks are generally used in computers to serve as permanent storage devices with large capacity. However, the performance of a hard disk (such as a read/write speed of the hard disk) is affected by vibrations generated when a system fan of the computer operates. For a server including multiple hard disks, such as a network attached storage (abbreviated as NAS) server, not only do vibrations generated from operation of the system fan adversely affect the overall performance of the server, when multiple hard disks operate simultaneously, vibrations generated thereby, as well as interference between adjacent operating hard disks, also adversely affect the overall performance of the server.

To solve this problem, several strategies have been developed, such as those disclosed in Taiwanese Patent Nos. I321274, I323883 and I332200, by implementing an anti-vibration mechanism.

SUMMARY OF THE INVENTION

Therefore, one object of the present invention is to provide a method for managing read/write operations on an electronic device that includes multiple hard disks to enhance the overall performance without having to implement an additional anti-vibration mechanism.

According to an embodiment of the invention, there is provided a method for managing read/write operations on an electronic device that includes a plurality of hard disks. The method includes the step of: (A) upon receipt of read/write operation information related to an intended read/write operation to be performed on the electronic device, configuring a processor to decide which of the hard disks will be read/written with reference to the read/write operation information and a plurality of sets of pre-established performance information. The sets of pre-established performance information respectively correspond to a plurality of read/write operation settings. Each of the sets of pre-established performance information includes a plurality of pieces of information, each containing a performance indication related to a corresponding one of a plurality of candidate combinations of the hard disks under the corresponding one of the read/write operation settings. In step (A), the processor is configured to decide which of the hard disks will be read/written with reference to the set of pre-established performance information, the read/write operation setting corresponding to which matches the read/write operation information.

An embodiment of the invention is to provide a system for managing read/write operations on an electronic device that includes multiple hard disks to enhance the overall performance without having to implement an additional anti-vibration mechanism.

According to an embodiment of the invention, there is provided a system for managing read/write operations on an electronic device that includes multiple hard disks. The system includes a memory unit and a deciding unit. The memory unit is stored with a plurality of sets of pre-established performance information, wherein the sets of pre-established performance information respectively correspond to a plurality of read/write operation settings, and each of the sets of pre-established performance information includes a plurality of pieces of information each containing a performance indication related to a corresponding one of a plurality of candidate combinations of the hard disks under the corresponding one of the read/write operation settings. The deciding unit is coupled electrically to the memory unit, receives read/write operation information related to an intended read/write operation to be performed on the electronic device, and decides which of the hard disks will be read/written with reference to the set of pre-established performance information, the read/write operation setting corresponding to which matches the read/write operation information.

Still another object of this invention is to provide an electronic device with enhanced performance. The electronic device includes the aforementioned hard disks and the aforementioned system for managing read/write operations.

BRIEF DESCRIPTION OF THE DRAWINGS

Other features and advantages of the present invention will become apparent in the following detailed description of the embodiment with reference to the accompanying drawings, of which.

DETAILED DESCRIPTION OF THE PREFERRED EMBODIMENT

Before the present invention is described in greater detail with reference to the accompanying embodiments, it should be noted herein that like elements are denoted by the same reference numerals throughout the disclosure.

Figure 1:
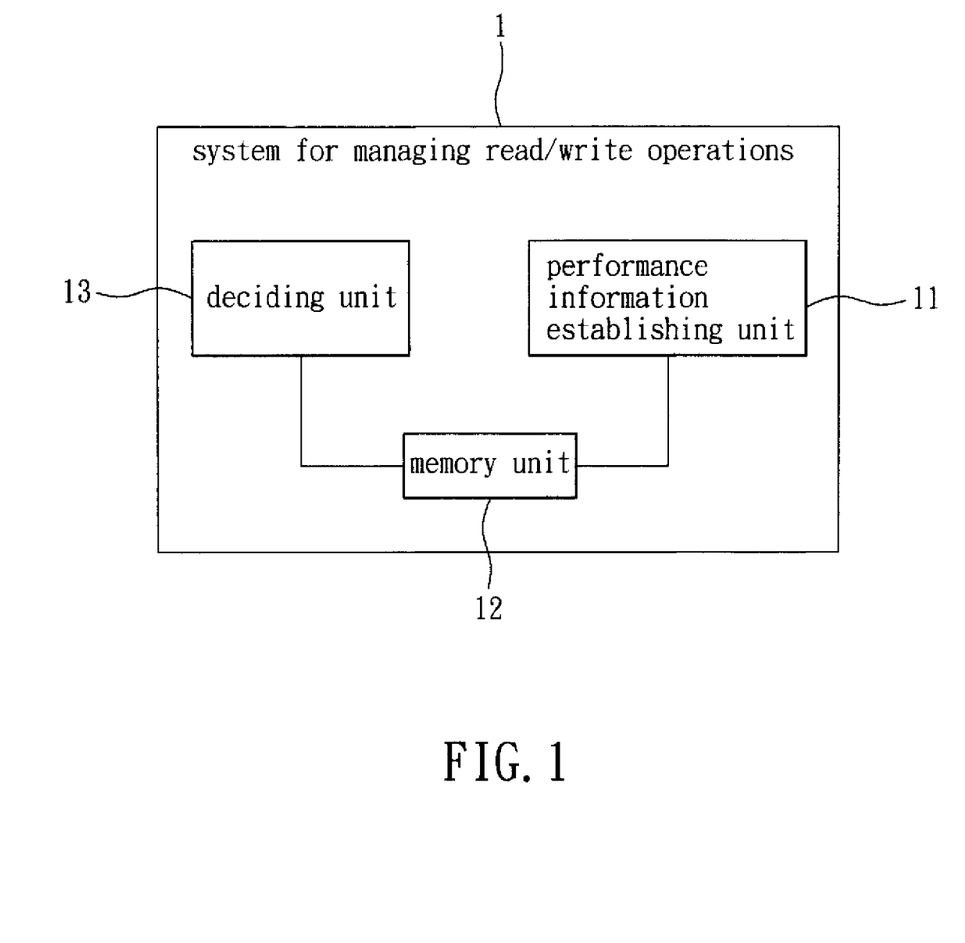
FIG. 1 is a block diagram of the embodiment of a system for managing read/write operations on an electronic device that includes a plurality of hard disks according to the invention.
Figure 2:
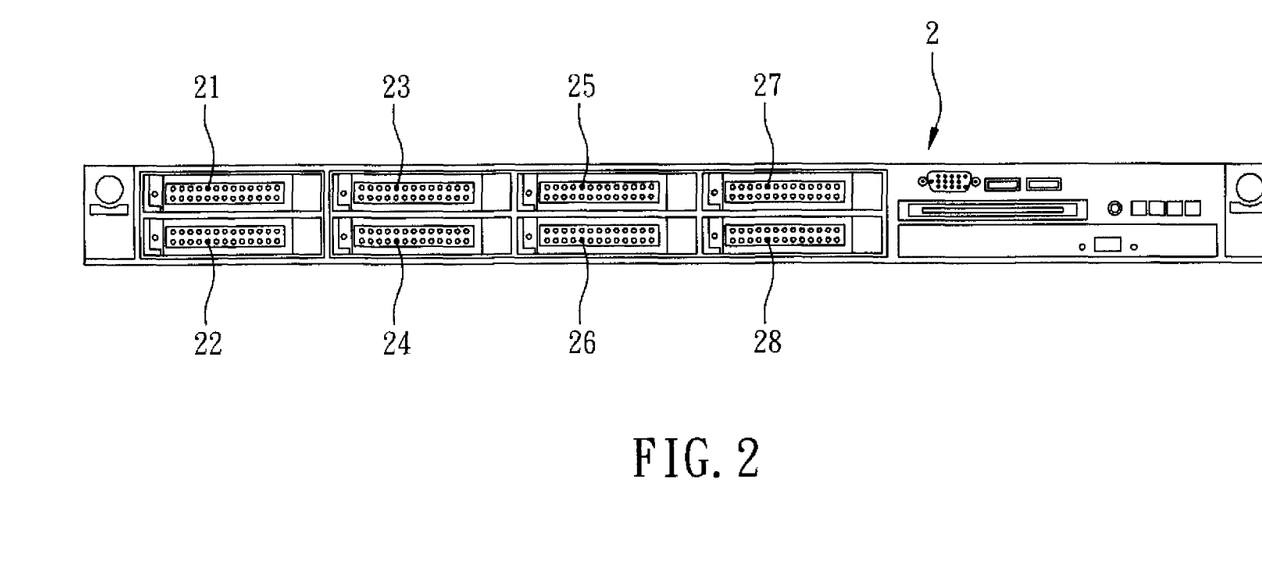
FIG. 2 is a schematic diagram of the embodiment of the electronic device implementing the system for managing read/write operations according to the invention.

Referring to FIG. 1 and FIG. 2, the embodiment of a system 1 for managing read/write operations on an electronic device that includes a plurality of hard disks according to the invention is shown to be implemented on an electronic device 2 that includes eight hard disks 21~28 and at least one system fan (not shown). In this embodiment, the electronic device 2 is a storage server, such as a network attached storage server (abbreviated as NAS) server.

The system 1 includes a memory unit 12 and a deciding unit 13, may be implemented by software, firmware, hardware, or a combination thereof, and may be integrated into the electronic device 2.

The memory unit 12 is stored with a plurality of sets of pre-established performance information. The sets of pre-established performance information respectively correspond to a plurality of read/write operation settings. Each of the sets of pre-established performance information includes a plurality of pieces of information, each containing a performance indication related to a corresponding one of a plurality of candidate combinations of the hard disks 21~28 under the corresponding one of the read/write operation settings.

The deciding unit 13 is coupled electrically to the memory unit 12, receives read/write operation information related to an intended read/write operation to be performed on the electronic device 2, and decides which of the hard disks 21~28 of the electronic device 2 will be read/written with reference to the read/write operation information and the sets of pre-established performance information stored in the memory unit 12. In particular, the decision is made with reference to the set of pre-established performance information, the read/write operation setting corresponding to which matches the read/write operation information.

In this embodiment, the system 1 further includes a performance information establishing unit 11 coupled electrically to the memory unit 12. The performance information establishing unit 11 is used to establish the sets of pre-established performance information and to store the same in the memory unit 12.

Operation of the system 1 will be better illustrated with reference to the embodiment of a method for managing read/write operations on an electronic device that includes a plurality of hard disks according to the invention. The method may be divided into two stages, namely a performance information establishing stage and a runtime stage.

Figure 3:
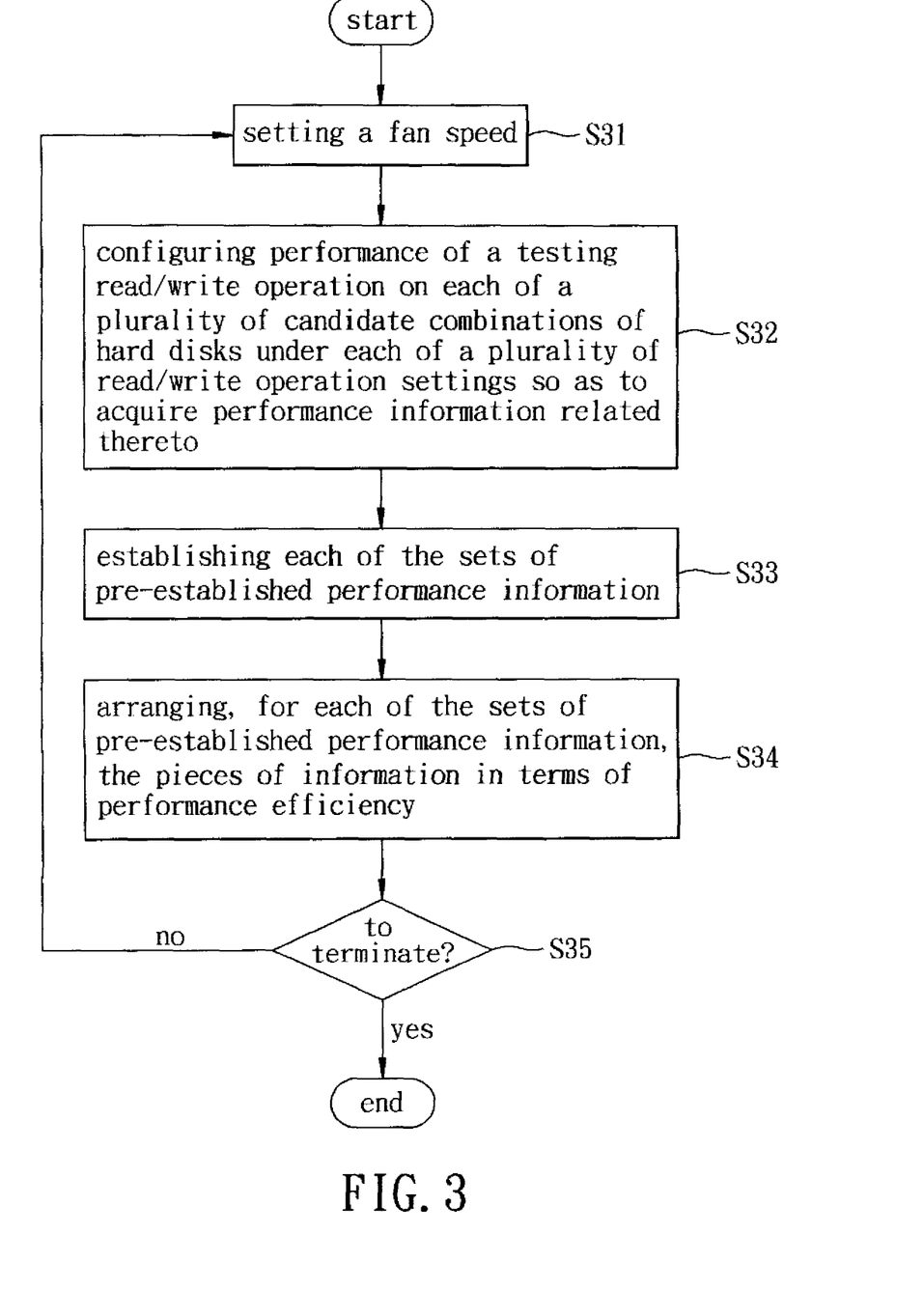
FIG. 3 is a flow chart for illustrating a performance information establishing stage of the embodiment of a method for managing read/write operations on an electronic device that includes a plurality of hard disks according to the invention.

Referring to FIG. 1, FIG. 2 and FIG. 3, the performance information establishing stage includes the following steps.

In step S31, a fan speed of the system fan of the electronic device 2 (in units of revolutions per minute (rpm)) is set at a desired value.

In step S32, under the same fan speed, the performance information establishing unit 11 configures performance of a testing read/write operation on each of a plurality of candidate combinations of the hard disks 21~28 of the electronic device 2 under each of a plurality of read/write operation settings so as to acquire performance information related thereto. Each of the read/write operation settings includes a number of hard disks to be read and a number of hard disks to be written. In this embodiment, for each given read/write operation setting, e.g., reading from one hard disk and writing into one hard disk, the testing read/write operation is performed on every possible candidate combination of the hard disks 21~28, i.e., reading from hard disk 21 and writing into hard disk 22, reading from hard disk 21 and writing into hard disk 23, ..., reading from hard disk 28 and writing into hard disk 27. Under the condition that the system fan operates with the same fan speed, the total number of candidate combinations for all possible read/write operation settings may be represented by Formula (1) below:

$$N_{combination} = \sum_{i=0}^{N_{hd}} \sum_{j=0}^{(N_{hd}-i)} \left( C_i^{N_{hd}} C_j^{(N_{hd}-i)} \right) \quad (1)$$

where $N_{combination}$ denotes the total number of the candidate combinations of the hard disks, $N_{hd}$ denotes the total number of the hard disks 21~28 in the electronic device 2 (in this embodiment, $N_{hd}=8$) i denotes the number of the hard disks to be read, and j denotes the number of the hard disks to be written.

It is worth to mention that although in this embodiment, the testing read/write operation is conducted on all possible candidate combinations of the hard disks 21~28 of the electronic device 2, to save time spent during the performance information establishing stage, a maximum number of hard disks to be concurrently read and a maximum number of hard disks to be concurrently written may be set in order to reduce the total number of testing read/write operations performed. Under such circumstance, the total number of candidate combinations for which the testing read/write operation is performed may be represented by Formula (2) below:

$$N_{combination} = \sum_{i=0}^{N_{max\_r}} \sum_{j=0}^{N_{max\_w}} \left( C_i^{N_{hd}} C_j^{(N_{hd}-i)} \right) \quad (2)$$

where $N_{max\_r}$ denotes the maximum number of hard disks to be concurrently read, $N_{max\_w}$ denotes the maximum number of hard disks to be concurrently written, and $N_{max\_r} + N_{max\_w} \leq N_{hd}$.

In step S33, with reference to the results of step S32, i.e., the candidate combinations under the corresponding one of the read/write operation settings and the performance information related thereto, the performance information establishing unit 11 establishes each of the sets of pre-established performance information, where the performance indication contained in each of the pieces of information of the set is derived from the performance information related to the corresponding one of the candidate combinations.

In this embodiment, the performance information related to the testing read/write operation performed on each of the candidate combinations under each of the read/write operation settings as acquired in step S32 includes the reading speed of each hard disk read and the writing speed of each hard disk written, and the performance indication is the average of the reading and writing speeds (hereinafter referred to as the average read/write speed).

In step S34, the performance information establishing unit 11 further arranges, for each of the sets of pre-established performance information, the pieces of information in terms of performance efficiency (i.e., read/write speed) by referring to the performance indications, and stores the same in the memory unit 12 for subsequent use during the runtime stage.

In step S35, the performance information establishing unit 11 determines whether a terminating condition for the performance information establishing stage is met. In the affirmative, the performance information establishing stage is terminated, and the system 1 is ready for the runtime stage. Otherwise, the flow goes back to step S31.

In this embodiment, the plurality of sets of pre-established performance information obtained under the same fan speed of the system fan of the electronic device 2 cooperatively constitute a group, and in the performance information establishing stage, a plurality of the groups, each relating to a different given fan speed of the system fan, are established. Accordingly, the terminating condition is met if establishment of the group related to each desired fan speed is completed. If the terminating condition is not met, the flow goes back to step S31 to set the fan speed of the system fan to another desired value that has yet to be set.

After the performance information establishing stage is completed, in the memory unit 12, there is, for each different fan speed, a group constituted by a plurality of sets of performance information corresponding respectively to a plurality of read/write operation settings, with the pieces of information in each set arranged in order in terms of performance efficiency related to the candidate combinations of the hard disks 21~28 of the electronic device 2. For example, under the condition that the system fan of the electronic device 2 operates with a fan speed of (K), the sets of performance information constituting the corresponding group may look something like Table 1 below, assuming that both $N_{max\_r}$ and $N_{max\_w}$ are 2 for simplification of illustration.

TABLE 1

| Fan Speed = K | |
|---|---|
| read/write operation setting 1 (i = 0, j = 1) | |
| candidate combination $_1$ (e.g., writing into $HD_{21}$) | performance indication $X_1$ |
| . | . |
| . | . |
| . | . |
| candidate combination $_{k1}$ (e.g., writing into $HD_{28}$) | performance indication $X_{k1}$ |
| read/write operation setting 2 (i = 0, j = 2) | |
| candidate combination $_{k1+1}$ (e.g., writing into $HD_{21}$ & $HD_{26}$) | performance indication $X_{k1+1}$ |
| . | . |
| . | . |
| . | . |
| candidate combination $_{k1+k2}$ (e.g., writing into $HD_{26}$ & $HD_{28}$) | performance indication $X_{k1+k2}$ |
| . | |
| . | |
| . | |
| read/write operation setting m (i = max_r, j = max_w) | |
| candidate combination $_{k1+k2+\ldots+1}$ (e.g., reading from $HD_{21}$ & $HD_{25}$ and writing into $HD_{24}$ & $HD_{28}$) | performance indication $X_{k1+k2+\ldots+1}$ |
| . | . |
| . | . |
| . | . |
| candidate combination $_{k1+k2+\ldots+km}$ (e.g., reading from $HD_{23}$ & $HD_{25}$ and writing into $HD_{24}$ & $HD_{26}$) | performance indication $X_{k1+k2+\ldots+km}$ |

In Table 1, under each read/write operating setting, the pieces of information are arranged in descending order in terms of the average read/write speed (i.e., the performance indication). Since, apart from the vibrations caused by operation of the system fan, the read/write speed of the hard disks 21~28 is also affected by the overall vibration generated by any operating hard disk 21~28, and/or due to interference between concurrent operations of adjacent hard disks 21~28, it is likely for a candidate combination in which the hard disks to be read/written are more dispersed to have better performance. For example, with reference to FIG. 2, it is likely that concurrent reading from hard disk 21 and writing into hard disk 28 excels in performance as compared to simultaneous reading from hard disk 24 and writing into hard disk 23.

It should be noted herein that the performance information establishing stage may be conducted in the factory and have all the necessary performance information pre-stored in the memory unit 12 before the electronic device 2 is put out in the market for sale. In this case, the electronic device 2 can either omit the performance information establishing unit 11 altogether, or the performance information establishing unit 11 may only need to execute the performance information establishing stage when a change among the hard disks 21~28 is detected, such as when disk removal of one of the hard disks 21~28 is detected, in order to update relevant performance information.

Figure 4:
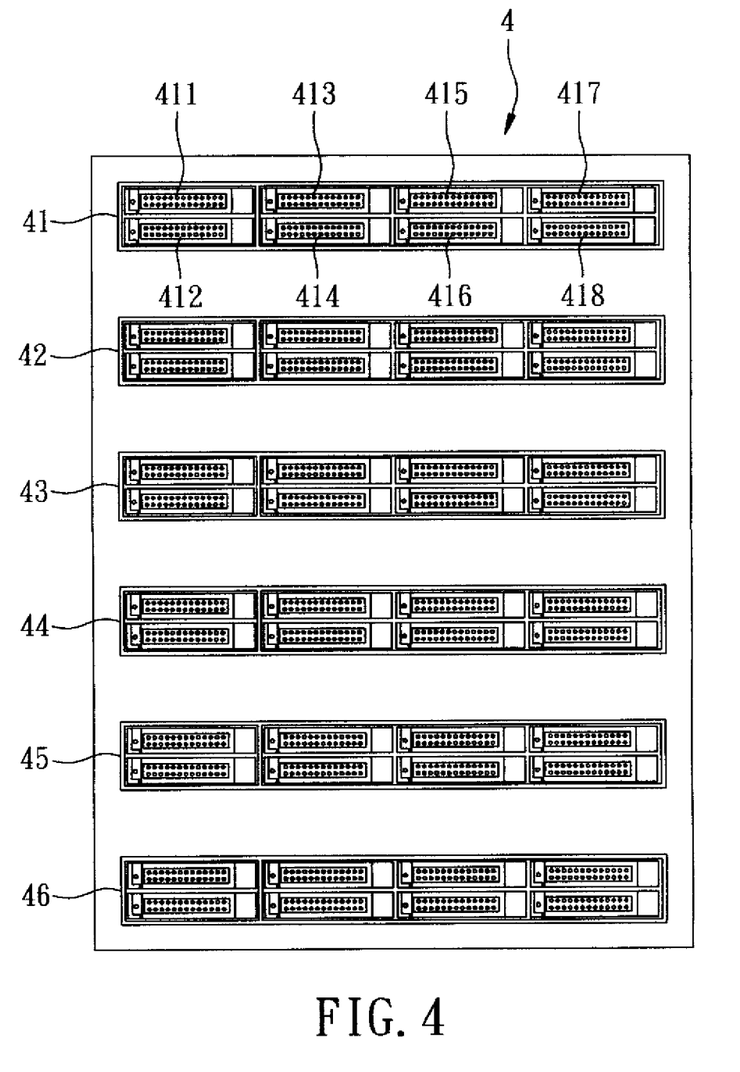
FIG. 4 is a schematic diagram of the embodiment of another electronic device implementing the system for managing read/write operations according to the invention.

Referring to FIG. 1, FIG. 3 and FIG. 4, it should be noted herein that since there is a tendency for storage servers to have an increased number of hard disks, for example, the electronic device 4 shown in FIG. 4 includes forty-eight hard disks, it is relatively time-consuming for the performance information establishing unit 11 to complete the performance information establishing stage for all possible candidate combinations under all possible read/write operation settings and all desired rotation speeds of the system fan on such kind of storage servers, while the capacity of the memory unit 12 also needs to be increased. Therefore, under consideration of time and space allocation, when the number of hard disks in the electronic device 4 is greater than a predefined threshold, the hard disks may be divided into clusters 41~46 and the performance information establishing stage may be individually performed on the hard disks in each cluster, e.g., hard disks 411~418 for cluster 41.

Figure 5:
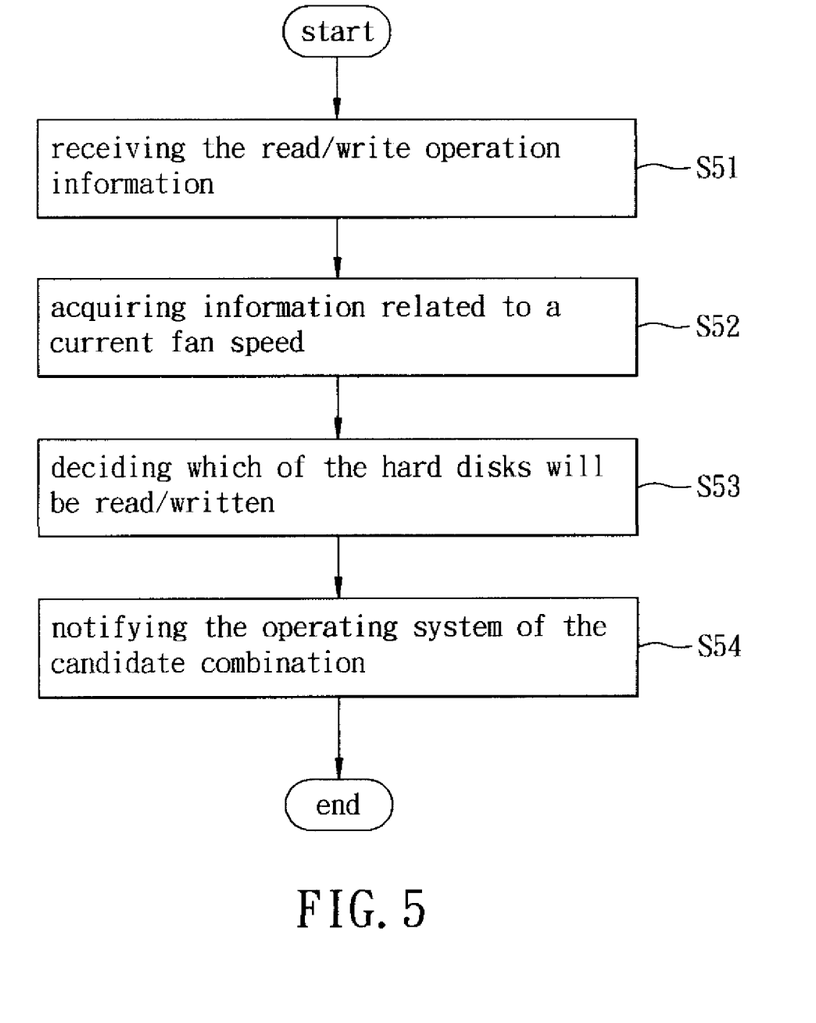
FIG. 5 is a flow chart for illustrating a runtime stage of the embodiment of the method for managing read/write operations on an electronic device that includes a plurality of hard disks according to the invention.

Referring back to FIG. 1 and FIG. 2, in addition to FIG. 5, when a read/write operation is intended on the electronic device 2, a read/write operation information related to the intended read/write operation is generated by, say, an operating system of the electronic device 2, and the runtime stage begins. The read/write operation information contains designated hard disks 21~28 to be read and a number of the hard disks 21~28 to be written. For example, the read/write operation information may indicate that read operations are intended on hard disk 21 and hard disk 22 and that write operations are intended on three of the hard disks 21~28.

The runtime stage includes the following steps.

In the step S51, the deciding unit 13 receives the read/write operation information.

In step S52, the deciding unit 13 acquires information related to a current fan speed of the system fan of the electronic device 2. In this embodiment, the deciding unit 13 uses the hardware monitoring functionality provided by the basic input/output systems (BIOS) to acquire such information.

In step S53, the deciding unit 13 decides which of the hard disks 21~28 of the electronic device 2 will be read/written with reference to the read/write operation information, the current fan speed, and the groups, each constituted by the sets of pre-established performance information related to a corresponding fan speed. Specifically, the decision is made with reference to the set of pre-established performance information, the read/write operation setting corresponding to which matches the read/write operation information, and which belongs to the group constituted by the sets of pre-established performance information that relates to the current fan speed.

If the current fan speed is K, continuing with the above example, it can be derived from the read/write operation information which designates reading of the hard disks 21 and 22 and writing into three of the hard disks 21~28 that a total of two hard disks are to be read and a total of three hard disks are to be written into. The decision is made by first locating the group that corresponds to fan speed (K), and then locating, in the group, the set of pre-established performance information corresponding to the read/write operation setting of i=2 and j=3.

In this embodiment, the deciding unit 13 decides which of the hard disks 21~28 will be read/written by selecting, from among the candidate combinations of the hard disks 21~28 under the read/write operation setting that matches the read/write operation information and in the group that is related to the current fan speed, one candidate combination, the performance indication related to which satisfies a predetermined condition. For example, the performance indication related to said one candidate combination selected by the deciding unit 13 may indicate a most superior read/write efficiency under the same read/write operation setting.

It is noted that when the read/write operation information contains information designating which of the hard disks 21~28 will be read, e.g., hard disks 21 and 22 in the previous example, the selection of the candidate combination is essentially governed by the premise that the hard disks read are designated to be the hard disks 21 and 22. Therefore, in that example, under the same read/write operation setting of i=2 and j=3, the candidate combinations available for selection are limited to the subset involving concurrent reading of hard disks 21 and 22, and the candidate combination with the most superior read/write efficiency within this sub-set is selected, i.e., the combination involving concurrent reading of hard disks 21 and 22 and writing of three of the hard disks 23~28 with the most superior average read/write speed is selected.

In step S54, the deciding unit 13 notifies the operating system of the candidate combination decided in step S53 so as to facilitate subsequent performance of the intended read/write operation on the electronic device 2.

It should be apparent from the disclosure that "a read/write operation" or a "testing read/write operation" as used herein does not mean a single read operation or a single write operation, but is used to represent reading and writing operations that are concurrently performed.

To sum up, the system 1 and method for managing read/write operations on an electronic device that includes a plurality of hard disks according to the invention utilize a plurality of sets of pre-established performance information related to possible hard disk combinations for an intended read/write operation to facilitate deciding which of the hard disks in the electronic device will have the intended read/write operation performed thereon in order to minimize the adverse effects created by vibrations of the system fan, vibrations of operating hard disks and interference between adjacent operating hard disks without having to provide the electronic device with an additional anti-vibration mechanism as taught by the prior art.

While the present invention has been described in connection with what are considered the most practical and embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for managing read/write operations on an electronic device that includes a plurality of hard disks, said method comprising the step of:
(A) upon receipt of read/write operation information related to an intended read/write operation to be performed on the electronic device, configuring a processor to decide which of the hard disks will be read/written with reference to the read/write operation information and a plurality of sets of pre-established performance information;
wherein the sets of pre-established performance information respectively correspond to a plurality of read/write operation settings, and each of the sets of pre-established performance information includes a plurality of pieces of information each containing a performance indication related to a corresponding one of a plurality of candidate combinations of the hard disks under the corresponding one of the read/write operation settings; and
wherein, in step (A), the processor is configured to decide which of the hard disks will be read/written with reference to the set of pre-established performance information, the read/write operation setting corresponding to which matches the read/write operation information;
the method further comprising, prior to step (A), the steps of:
(B) performing a testing read/write operation on each of the candidate combinations of the hard disks of the electronic device under each of the read/write operation settings so as to acquire performance information related thereto; and
(C) establishing each of the sets of pre-established performance information with reference to the candidate combinations under the corresponding one of the read/write operation settings and the performance information related thereto, the performance indication contained in each of the pieces of information of the set of pre-established performance information being derived from the performance information related to the corresponding one of the candidate combinations;
wherein the testing read/write operations are performed on the candidate combinations in step (B) when a system fan of the electronic device operates under the same fan speed.

2. The method as claimed in claim 1, wherein the processor is configured to decide which of the hard disks will be read/written by selecting, from among the candidate combinations of the hard disks under the read/write operation setting that matches the read/write operation information, one candidate combination, the performance indication related to which satisfies a predetermined condition.

3. The method as claimed in claim 2, wherein the performance indication related to said one candidate combination selected by said processor indicates a most superior read/write efficiency under the same read/write operation setting.

4. The method as claimed in claim 1, further comprising the step of:
(D) for each of the sets of pre-established performance information, arranging the pieces of information in terms of performance efficiency by referring to the performance indications.

5. The method as claimed in claim 1, wherein:
the plurality of sets of pre-established performance information cooperatively constitute a group, and there are a plurality of the groups, each relating to a different fan speed of the system fan; and
in step (A), the processor is further configured to acquire information related to a current fan speed of the system fan, and is configured to decide which of the hard disks will be read/written with reference to the read/write operation information and the group that relates to the current fan speed.

6. A system for managing read/write operations on an electronic device that includes a plurality of hard disks, said system comprising:
a memory unit pre-stored with a plurality of sets of pre-established performance information, wherein the sets of pre-established performance information respectively correspond to a plurality of read/write operation settings, and each of the sets of pre-established performance information includes a plurality of pieces of information each containing a performance indication related to a corresponding one of a plurality of candidate combinations of the hard disks under the corresponding one of the read/write operation settings; and a deciding unit coupled electrically to said memory unit for receiving read/write operation information related to an intended read/write operation to be performed on the electronic device, and deciding which of the hard disks will be read/written with reference to the set of pre-established performance information, the read/write operation setting corresponding to which matches the read/write operation information;

the system further comprising a performance information establishing unit coupled electrically to said memory unit, said performance information establishing unit configuring performance of a testing read/write operation on each of the candidate combinations of the hard disks of the electronic device under each of the read/write operation settings so as to acquire performance information related thereto, and establishing each of the sets of pre-established performance information with reference to the candidate combinations under the corresponding one of the read/write operation settings and the performance information related thereto, the performance indication contained in each of the pieces of information of the set of pre-established performance information being derived from the performance information related to the corresponding one of the candidate combinations;

wherein the testing read/write operations are performed on the candidate combinations when a system fan of the electronic device operates under the same fan speed.

7. The system as claimed in claim 6, wherein said deciding unit decides which of the hard disks will be read/written by selecting, from among the candidate combinations of the hard disks under the read/write operation setting that matches the read/write operation information, one candidate combination, the performance indication related to which satisfies a predetermined condition.

8. The system as claimed in claim 7, wherein the performance indication related to said one candidate combination selected by said deciding unit indicates a most superior read/write efficiency under the same read/write operation setting.

9. The system as claimed in claim 6, wherein said performance information establishing unit further arranges, for each of the sets of pre-established performance information, the pieces of information in terms of performance efficiency by referring to the performance indications.

10. The system as claimed in claim 6, wherein:
the plurality of sets of pre-established performance information cooperatively constitute a group, and stored in said memory unit are a plurality of the groups, each relating to a different given fan speed of the system fan of the electronic device; and
said deciding unit further acquires information related to a current fan speed of a system fan, and decides which of the hard disks will be read/written with reference to the read/write operation information and the group that relates to the current fan speed.

11. An electronic device comprising
a plurality of hard disks;
a memory unit pre-stored with a plurality of sets of pre-established performance information, wherein the sets of pre-established performance information respectively correspond to a plurality of read/write operation settings, and each of the sets of pre-established performance information includes a plurality of pieces of information each containing a performance indication related to a corresponding one of a plurality of candidate combinations of said hard disks under the corresponding one of the read/write operation settings; and a deciding unit coupled electrically to said memory unit for receiving read/write operation information related to an intended read/write operation to be performed on said electronic device, and deciding which of said hard disks will be read/written with reference to the set of pre-established performance information, the read/write operation setting corresponding to which matches the read/write operation information;

the electronic device further comprising a performance information establishing unit coupled electrically to said memory unit, said performance information establishing unit configuring performance of a testing read/write operation on each of the candidate combinations of said hard disks under each of the read/write operation settings so as to acquire performance information related thereto, and establishing each of the sets of pre-established performance information with reference to the candidate combinations under the corresponding one of the read/write operation settings and the performance information related thereto, the performance indication contained in each of the pieces of information of the set of pre-established performance information being derived from the performance information related to the corresponding one of the candidate combinations;

the electronic device further comprising a system fan, wherein the testing read/write operations are performed on the candidate combinations when said system fan operates under the same fan speed.

12. The electronic device as claimed in claim 11, wherein said deciding unit decides which of said hard disks will be read/written by selecting, from among the candidate combinations of said hard disks under the read/write operation setting that matches the read/write operation information, one candidate combination, the performance indication related to which satisfies a predetermined condition.

13. The electronic device as claimed in claim 12, wherein the performance indication related to said one candidate combination selected by said deciding unit indicates a most superior read/write efficiency under the same read/write operation setting.

14. The electronic device as claimed in claim 11, wherein said performance information establishing unit further arranges the pieces of information in terms of performance efficiency by referring to the performance information.

15. The electronic device as claimed in claim 11, wherein:
the plurality of sets of pre-established performance information cooperatively constitute a group, and stored in said memory unit are a plurality of the groups, each relating to a different given fan speed of said system fan; and
said deciding unit further receives information related to a current fan speed of said system fan, and decides which of said hard disks will be read/written with reference to the read/write operation information and the group that relates to the current fan speed.

* * * * *